June 27, 1944.  W. G. GINGERY  2,352,380
MAP PROJECTION
Filed Nov. 27, 1942
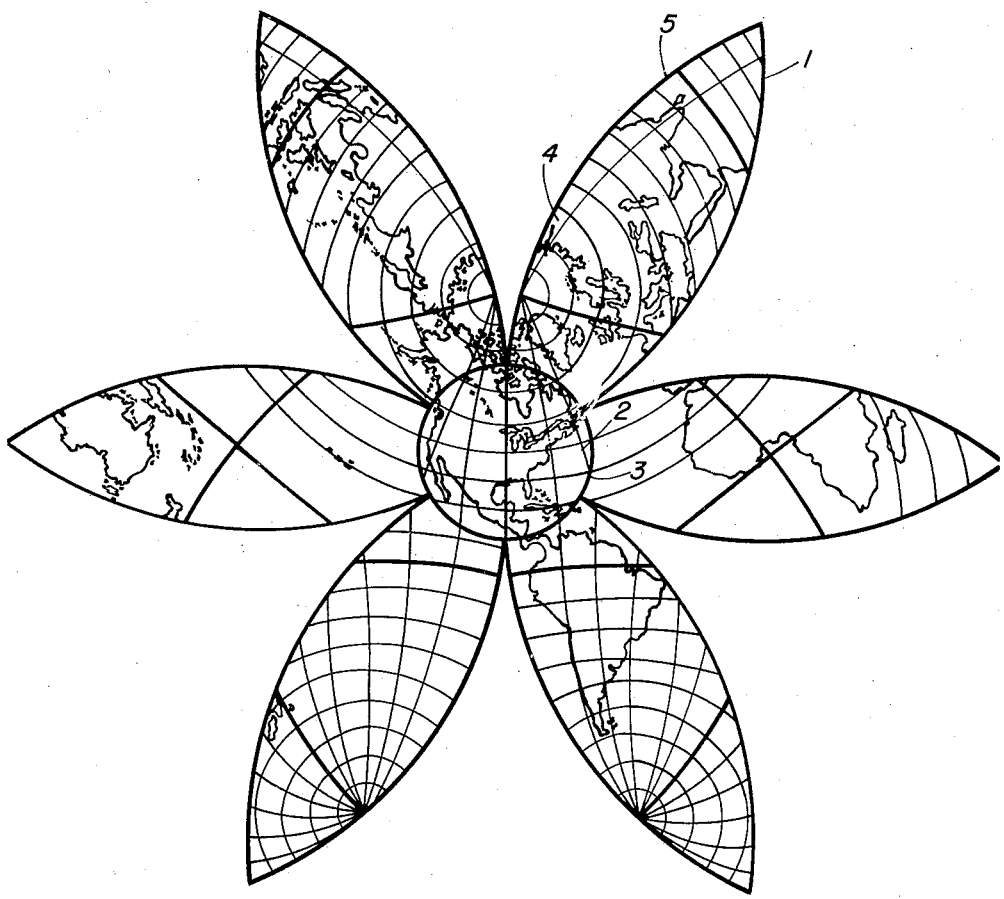
INVENTOR.
WALTER G. GINGERY
BY
Attorneys Patented June 27, 1944

2,352,380

UNITED STATES PATENT OFFICE 2,352,380

MAP PROJECTION

Walter G. Gingery, Indianapolis, Ind.

Application November 27, 1942, Serial No. 467,114

4 Claims. (Cl. 35—40)

The present invention relates to improvements in maps and more particularly to map projections. It is one of the objects of the invention to provide a map projection which will enable the observer to more accurately see the relation of the various land portions of the globe to one another and to the sea portion. It is a further object of the invention to provide a map projection which will have a minimum of distortions; which will more accurately portray the meridian and parallels and the distances and directions of various portions on the globe from that part represented in the central area of the map, and which will give a minimum of distortions of the shape of the land areas and their relationship.

For the purpose of disclosing the invention, I have illustrated an embodiment of the same in the accompanying drawing, the figure of which shows, more or less diagrammatically, one form of map projection embodying my invention.

In the construction of my improved map projection, the surface of the sphere or globe is divided into lunes having common vertices. In the present embodiment, I have illustrated a projection in which I have used six equal lunes. Beginning at one vertex, the lunes are cut apart to within a given distance of the other vertex. In the specific illustration, the distance is 30°. This will leave a central uncut portion around the second vertex, bounded by a small circle of the sphere.

The lunes and circle thus determined, are flattened into a single plane surface providing a plurality of gores 1 with the axes of the lunes projected as straight lines unchanged in length and each bounded by two smooth curves such that the gore approximates the shape of a lune. The inner portion of the gore merges into the uncut portion 2 bounded by a circle 3 with the radial distances of the circle unchanged by flattening but with the distances along circumferences of circles concentric to the boundary circle 3 elongated in proportion to the quotient of the angular radius divided by the sine of the angular radius.

In that half portion 4 of each of the gores adjacent the central circle 3, distances perpendicular to the axis of the gore are increased by an amount proportional to the distance from the center of the axis and equal at the circumference of the central circle 3 to the corresponding elongation of that portion of the circumference of the central circle which lies within the gore.

Placing the axis of the gore on the axis of abscissas with its center at the origin of rectangular coordinates and with the central circle to the left, the equation of the boundary of that part of the gore which lies between the central circle and the center of the gore, is $$Y = \pm \left\{ \frac{\pi R \alpha}{180} \cos \frac{x}{R} - \frac{2x}{\pi R - 2\rho \cos \alpha} \left[ \rho \sin \alpha - \frac{\pi R \alpha}{180} \cos \left( \frac{\pi}{2} - \frac{\rho}{R} \cos \alpha \right) \right] \right\}$$

Where

R equals the radius of the sphere
$\alpha$ equals the semi-angle of the lune in degrees, and
$\rho$ is the radius of the central circle.

For the remote half 5, the equation of the boundary becomes $$Y = \pm \frac{\pi R \alpha}{180} \cos \frac{x}{R}$$

Where R and $\alpha$ have the significance indicated above.

In the specific projection illustrated in the accompanying drawing, the, what may be termed, inner vertex of each gore is based upon a point within the United States and approximately at a point adjacent the city of St. Louis, Missouri. It is perfectly obvious, of course, that the inner vertex point may be at any other chosen point on the globe, depending upon the portion it is desired to illustrate within the circle 3. In any event, the structural arrangement of the parts would be the same and the relative position, size, etc. of the gores and circles will be the same.

It is obvious that the meridians of the gores and circle will coincide on the various gores and, likewise, the parallels will coincide. In other words, the gores are so developed, as well as the circle, that if these gores and circle were caused to again assume spherical shape, the meridians and parallels will be substantially continuous lines.

I have hertofore referred in the description of the projection of my map to the cutting apart of the lunes of the sphere or globe. It is obvious that the projection may be laid out on a flat surface on the same basis without actually cutting the parts as described.

I claim as my invention:

1. A map, comprising a plurality of gores, each comprising a flat surface bounded by two smooth curves such that when placed upon the surface of a globe it approximates the shape of a lune, said gores being uncut for a given distance from one of their vertices and leaving a small circular portion of the sphere which is flattened with said vertices being disposed at a point remote from the geographical poles of the globe.

2. A map, comprising a plurality of gores corresponding to a plurality of spherical lunes of a globe cut apart from the meeting place of certain vertices to within a given distance of the meeting place of the other vertices, with said meeting places being disposed at points remote from the geographical poles of the globe and having the uncut portion around said second meeting places comprising a disk-like section.

3. A map, comprising a circular portion of a globe flattened into a plane disk-like surface and having radiating therefrom a plurality of flattened gores each having one vertex based on the center of said disk-like portion and the opposite vertex adapted to coincide on the globe with a point diametrically opposite said first mentioned point on the globe with said vertices disposed at points remote from the geographical poles of the globe.

4. A map, comprising a plurality of gores corresponding to a plurality of spherical lunes cut apart from the meeting place of certain vertices to within a short distance of the meeting place of the opposing vertices leaving a central uncut portion around said second mentioned meeting place and flattened into a common plane with said meeting places of said vertices being disposed at a point remote from the geographical poles of the globe.

WALTER G. GINGERY.